US012573421B2

(12) United States Patent
Asif Bashir et al.

(10) Patent No.: US 12,573,421 B2
(45) Date of Patent: Mar. 10, 2026

(54) RESISTOR NETWORK FOR DELIVERING CURRENT AND A MAIN POLE COIL AND AN ASSISTIVE WRITE ELEMENT IN A MAGNETIC RECORDING DEVICE

(71) Applicant: Western Digital Technologies, Inc., San Jose, CA (US)

(72) Inventors: Muhammad Asif Bashir, San Jose, CA (US); Zhigang Bai, Fremont, CA (US); Shengjie Shi, San Jose, CA (US); Shuang Wu, San Jose, CA (US); Yunfei Ding, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/746,639

(22) Filed: Jun. 18, 2024

(65) Prior Publication Data

US 2025/0384896 A1      Dec. 18, 2025

(51) Int. Cl.
 *G11B 5/11* (2006.01)
 *G11B 5/02* (2006.01)
(52) U.S. Cl.
 CPC . *G11B 5/11* (2013.01); *G11B 5/02* (2013.01)
(58) Field of Classification Search
 None
 See application file for complete search history.

(56) References Cited

U.S. PATENT DOCUMENTS

| 8,724,242 B2 | 5/2014 | Gao |
| 8,929,030 B2 | 1/2015 | Hou et al. |
| 9,183,853 B2 | 11/2015 | Hsiao et al. |
| 9,378,756 B2 * | 6/2016 | Yamada ............... G11B 5/3133 |
| 9,672,846 B1 * | 6/2017 | Tanaka ..................... G11B 5/17 |
| 10,861,485 B1 | 12/2020 | Asif Bashir et al. |
| 10,957,348 B2 | 3/2021 | Bai et al. |
| 11,031,039 B1 | 6/2021 | Tang et al. |

(Continued)

FOREIGN PATENT DOCUMENTS

| JP | 2009064499 A | * | 3/2009 | ............. G11B 5/314 |
| JP | 2017162533 A | * | 9/2017 | ........... G11B 5/3189 |

OTHER PUBLICATIONS

The 32nd Magnetic Recording Conference, TMRC 2021, Virtual Conference Hosted by Carnegie Mellon University, Aug. 16-19, 2021, pp. 1-117, <https://www.dssc.ece.cmu.edu/TMRC2021/files/TRMC2021_DigestBook.pdf>.

*Primary Examiner* — William J Klimowicz
(74) *Attorney, Agent, or Firm* — Patterson + Sheridan, LLP

(57) ABSTRACT

The present disclosure generally relate to a magnetic recording device comprising a write head and a resistor network coupled to the write head. The resistor network comprises a first path comprising a primary coil of the write head and a second path in parallel with the first current path, the second path comprising an assistive write element of the write head. A preamplifier coupled to the resistor network is configured to apply current to the first and second paths, where the current diverts into the first and second paths individually. The resistor network is coupled to the preamplifier by a single lead. The first path is configured to apply current to a primary coil of the write head. The second path is configured to apply current from a leading shield, via the assistive write element, to a trailing shield at a media facing surface.

20 Claims, 8 Drawing Sheets

(56)         References Cited

U.S. PATENT DOCUMENTS

| | | | | |
|---|---|---|---|---|
| 11,600,293 | B1 * | 3/2023 | Lam | G11B 5/2654 |
| 11,875,825 | B1 * | 1/2024 | Liu | G11B 5/315 |
| 2008/0151436 | A1 * | 6/2008 | Sato | G11B 5/743 |
| 2011/0038080 | A1 * | 2/2011 | Alex | G11B 5/314 |
| | | | | 360/123.02 |
| 2011/0038081 | A1 * | 2/2011 | Contreras | H01F 10/329 |
| 2013/0120869 | A1 | 5/2013 | Das et al. | |
| 2014/0313613 | A1 | 10/2014 | Lee et al. | |
| 2015/0092301 | A1 * | 4/2015 | Fujita | G11B 5/3116 |
| | | | | 360/123.05 |
| 2018/0294010 | A1 * | 10/2018 | Tabata | G11B 5/02 |
| 2020/0279584 | A1 * | 9/2020 | Tomoda | G11B 5/012 |

* cited by examiner

RESISTOR NETWORK FOR DELIVERING CURRENT AND A MAIN POLE COIL AND AN ASSISTIVE WRITE ELEMENT IN A MAGNETIC RECORDING DEVICE

BACKGROUND OF THE DISCLOSURE

Field of the Disclosure

Embodiments of the present disclosure generally relate to a magnetic recording head assembly, such as a write head of a data storage device or a magnetic media drive.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in² for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface. As the main pole becomes smaller, the writing field becomes smaller as well, limiting the effectiveness of the magnetic write head.

A challenge for HDD designs where a current is applied through a write head to write data to media is that higher amounts of current can cause a temperature of the write head to increase, which can cause degradation such as at a media facing surface (MFS). The degradation can hinder performance and reliability of the write head, and can even render the write head inoperable. However, lowering currents can limit writing fields. Furthermore, it can be difficult to accurately tune the amount of current being directed to the MFS and/or to the primary coils.

Therefore, there is a need for write heads that simply and effectively facilitate write head performance reliability by being able to accurately tune current through the write head.

SUMMARY OF THE DISCLOSURE

The present disclosure generally relate to a magnetic recording device comprising a write head and a resistor network coupled to the write head. The resistor network comprises a first path comprising a primary coil of the write head and a second path in parallel with the first current path, the second path comprising an assistive write element of the write head. A preamplifier coupled to the resistor network is configured to apply current to the first and second paths, where the current diverts into the first and second paths individually. The resistor network is coupled to the preamplifier by a single lead. The first path is configured to apply current to a primary coil of the write head. The second path is configured to apply current from a leading shield, via the assistive write element, to a trailing shield at a media facing surface.

In one embodiment, a magnetic recording device comprises a preamplifier, a write head comprising: a trailing shield having a portion disposed at a media facing surface (MFS), a leading shield having a portion disposed at the MFS, a main pole disposed between the trailing shield and the leading shield, a primary coil wrapped around the main pole, an assistive write element, and a resistor network coupled to the preamplifier, the resistor network comprising: a first current path comprising the primary coil, and a second current path in parallel with the first current path, the second current path comprising the assistive write element.

In another embodiment, a magnetic recording device comprises a preamplifier, a write head comprising: a trailing shield having a portion disposed at a media facing surface (MFS), a leading shield having a portion disposed at the MFS, a main pole disposed between the trailing shield and the leading shield, an assistive write element, and a primary coil wrapped around the main pole, and a resistor network coupled to the preamplifier by a single lead, the resistor network comprising: a first current path comprising the primary coil and a first auxiliary resistance connected in series with the primary coil and a second current path in parallel with the first current path, the second current path comprising the assistive write element and a second auxiliary resistance connected in series with the assistive write element.

In yet another embodiment, a magnetic recording device comprises a preamplifier, a write head comprising: a trailing shield having a portion disposed at a media facing surface (MFS), a leading shield having a portion disposed at the MFS, a main pole disposed between the trailing shield and the leading shield, an assistive write element, and a primary coil wrapped around the main pole, and a resistor network coupled to the preamplifier, the resistor network comprising: a first current path comprising the primary coil and a first auxiliary resistance connected in series with the primary coil, wherein the first current path is configured to direct current to the primary coil, and a second current path in parallel with the first current path, the second current path comprising the assistive write element and a second auxiliary resistance connected in series with the assistive write element, wherein the second current path is coupled to the first current path through the leading shield and the trailing shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relate to a magnetic recording device comprising a write head and a resistor network coupled to the write head. The resistor network comprises a first path comprising a primary coil of the write head and a second path in parallel with the first current path, the second path comprising an assistive write element of the write head. A preamplifier coupled to the resistor network is configured to apply current to the first and second paths, where the current diverts into the first and second paths individually. The resistor network is coupled to the preamplifier by a single lead. The first path is configured to apply current to a primary coil of the write head. The second path is configured to apply current from a leading shield, via the assistive write element, to a trailing shield at a media facing surface.

Figure 1:
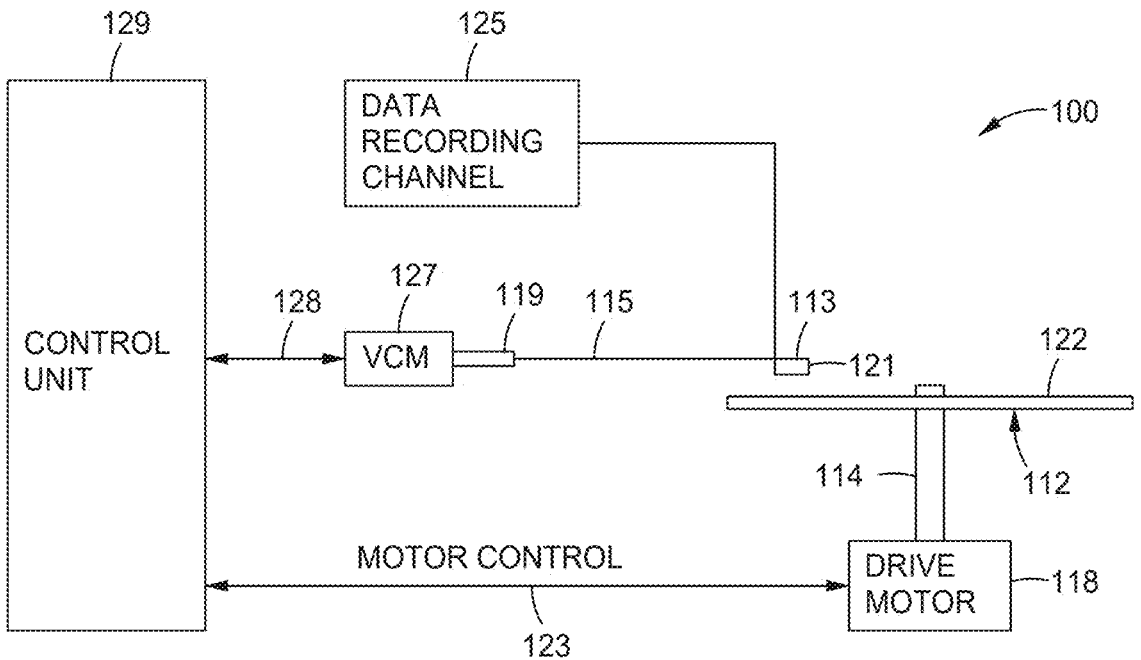
FIG. 1 illustrates a schematic view of a disk drive, according to one implementation.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnetic recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
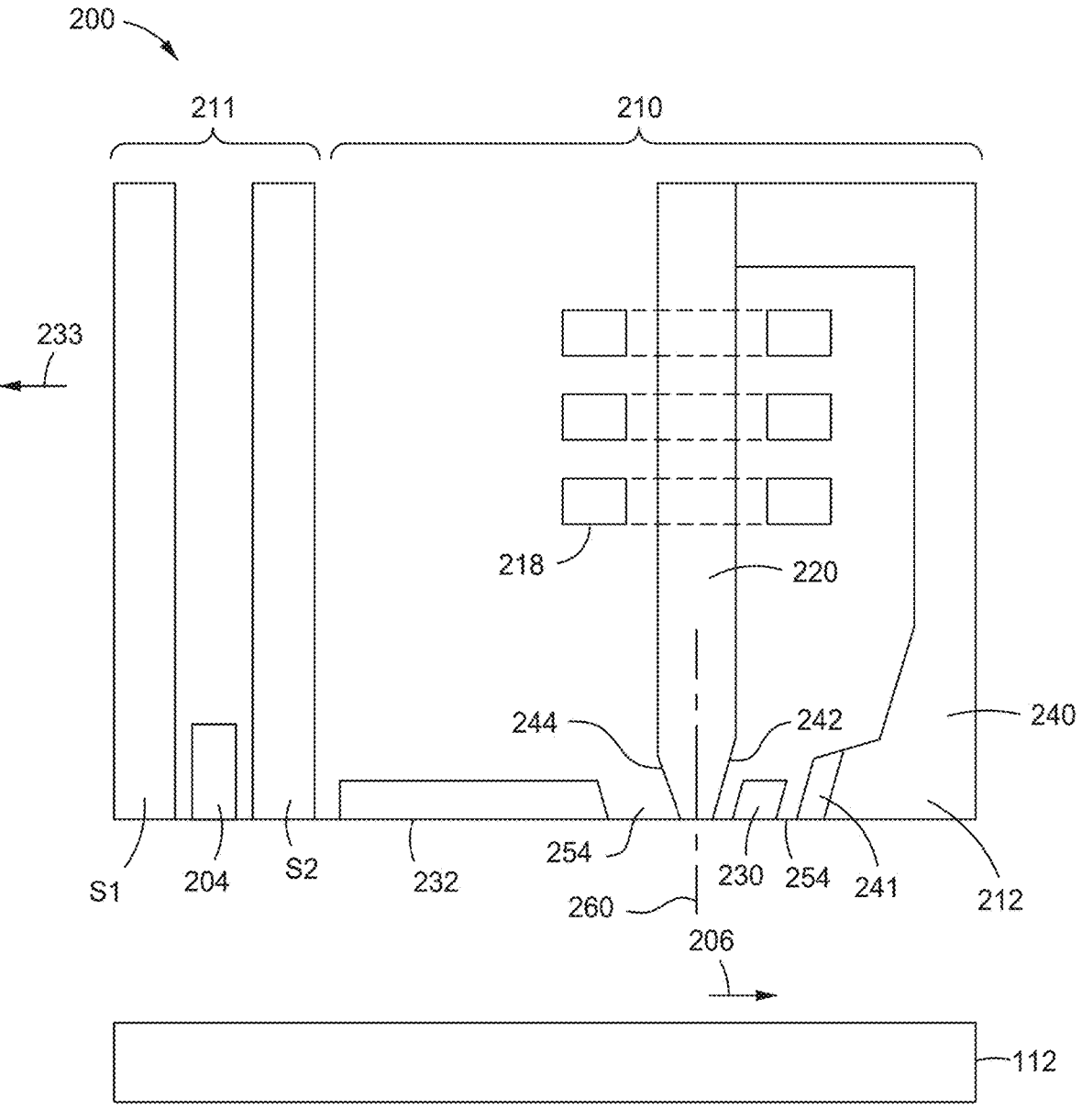
FIG. 2 is a fragmented and schematic cross-sectional side view through a center of a read/write head facing the magnetic media, according to one implementation.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and an optional spintronic device 230 disposed between the main pole 220 and the TS 240. The main pole 220 serves as a first electrode. Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In embodiments comprising a spintronic device 230, the spintronic device 230 is positioned proximate the main pole 220 and reduces the coercive force of the magnetic recording medium, so that smaller writing fields can be used to record data. In such embodiments, an electron current is applied to spintronic device 230 from a current source (not shown) to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 230 from a current source to produce a high frequency alternating current (AC) field to the media.

In one embodiment comprising a spintronic device 230, which can be combined with other embodiments, the spintronic device 230 is electrically coupled to the main pole 220 and the TS 240. The current source may provide electron current to the spintronic device 230 through the main pole 220 and the TS 240. For direct current or pulsed current, the current source may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

Figure 3A:
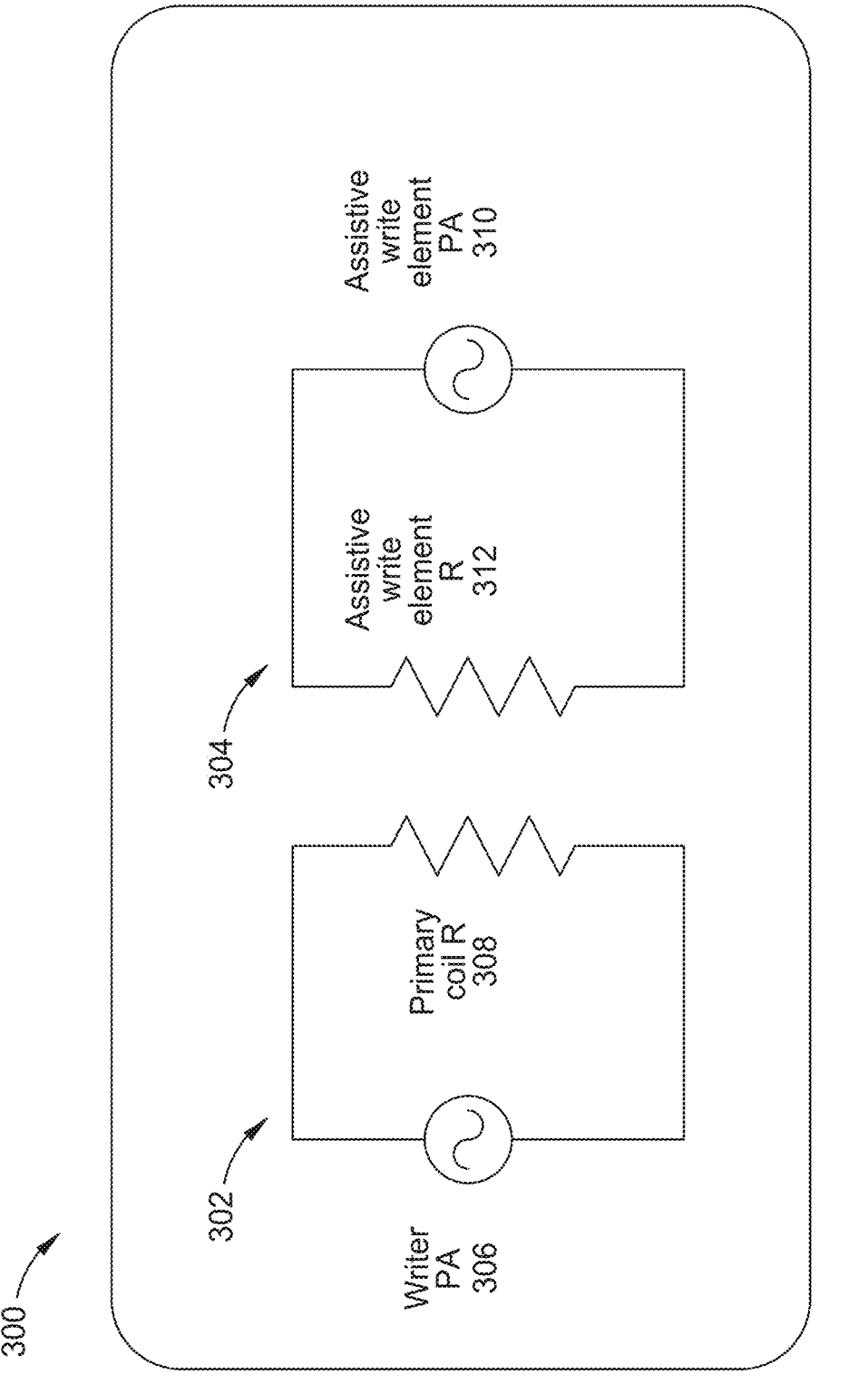
FIG. 3A illustrates conventional coil circuits of a conventional write head.
Figure 3B:
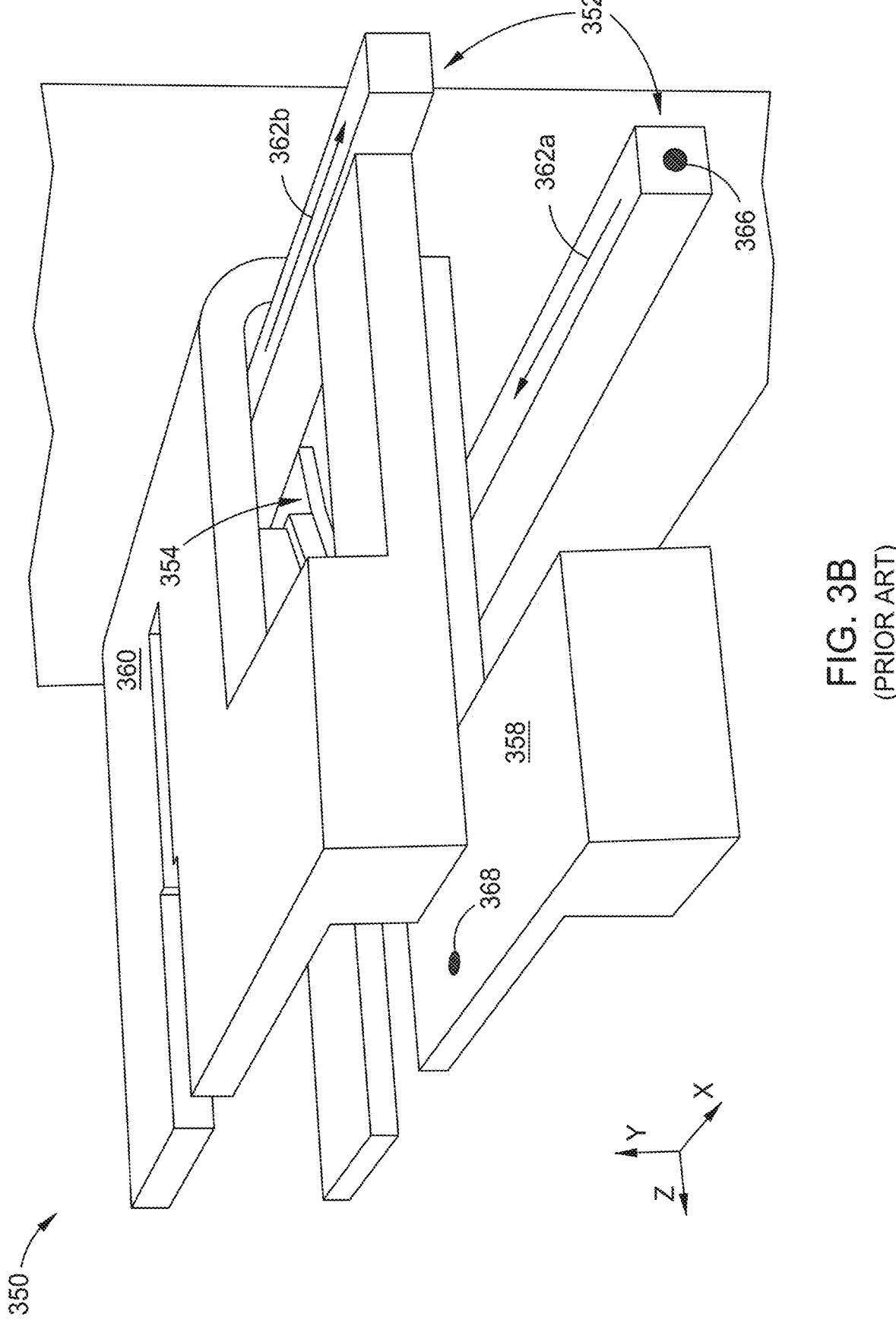
FIG. 3B illustrates an oblique view of the conventional write head utilizing the conventional coil circuits of FIG. 3A.

FIG. 3A illustrates conventional circuits 300 of a write head 350 having a main pole and an assistive write element. FIG. 3B illustrates an oblique view of the write head 350 utilizing the conventional circuits 300 of FIG. 3A. The circuits 300 comprise a first circuit 302 configured to apply current to the primary coil 352 around a main pole 354, and a second circuit 304 configured to apply current to an assistive write element near the main pole 354 at or near the MFS. The assistive write element may be in the form of a conductive layer through which current is applied. The first circuit 302 comprises a first preamp (PA) 306 connected to a first resistor 308 (symbolizing the primary coil 352). The second circuit 304 comprises a second preamp (PA) 310 connected to a second resistor 312 (symbolizing the assistive write element). Because the first and second circuits 302, 304 are separate, the current provided to the primary coil and the assistive write element can be tuned separately. However, having two individual circuits 302, 304 and two preamps 306, 310 can be costly, increasing the overall costs of the write head and associated supporting electronics.

FIG. 3B is an oblique view of the write head showing the two distinct circuits 302 and 304 referenced in FIG. 3A. As shown in FIG. 3B, the write head 350 comprises a main pole 354, a leading shield 358 disposed below the main pole 354, and a trailing shield 360 disposed over the main pole 354. The primary coil 352 (shown as a 1-turn coil) wraps around the main pole 354. The first circuit 302 includes a connection to the primary coil 352 using a first lead 366, and the second circuit 304 includes a connection to the leading shield 358 using a second lead 368.

In the first circuit 302, current travels in the direction of the arrow 362a on a bottom portion of the coil 352, curls around in the y-direction, and flows in the direction of the arrow 362b such that the current circles through the coil 352. The primary coil 352 is wrapped around the main pole 354 to energize it for the writing process. The current is limited to traveling through only the coil 352, and does not flow through the leading shield 358 or the trailing shield 360. While the coil 352 may be in contact with the trailing shield 360, current is prevented from flowing into the leading shield 358 and/or the trailing shield 360 by using a high resistance. In some embodiments, the primary coil 352 is spaced from the trailing shield 360.

In the second circuit 304, current travels via the second lead 368 in the leading shield 358 in the −Z direction toward a location near the MFS of the write head 350 where the assistive write element (not shown) is located. The leading shield 358, the assistive write element and the trailing shield 360 are fabricated such that a path exists for the current to run: (1) from the leading shield into the assistive write element, (2) through the assistive write element in a cross-track direction near the main pole, at or near the MFS, and (3) from the assistive write element into the trailing shield. A lead along the +Z direction from the MFS may be provided for the current to exit the trailing shield. As noted above, the first circuit 302's path (via the coil 352 around the main pole 354) and the second circuit 304's path (via the leading shield 358, the assistive write element and the trailing shield 360) are separated and driven separately.

Figure 4A:
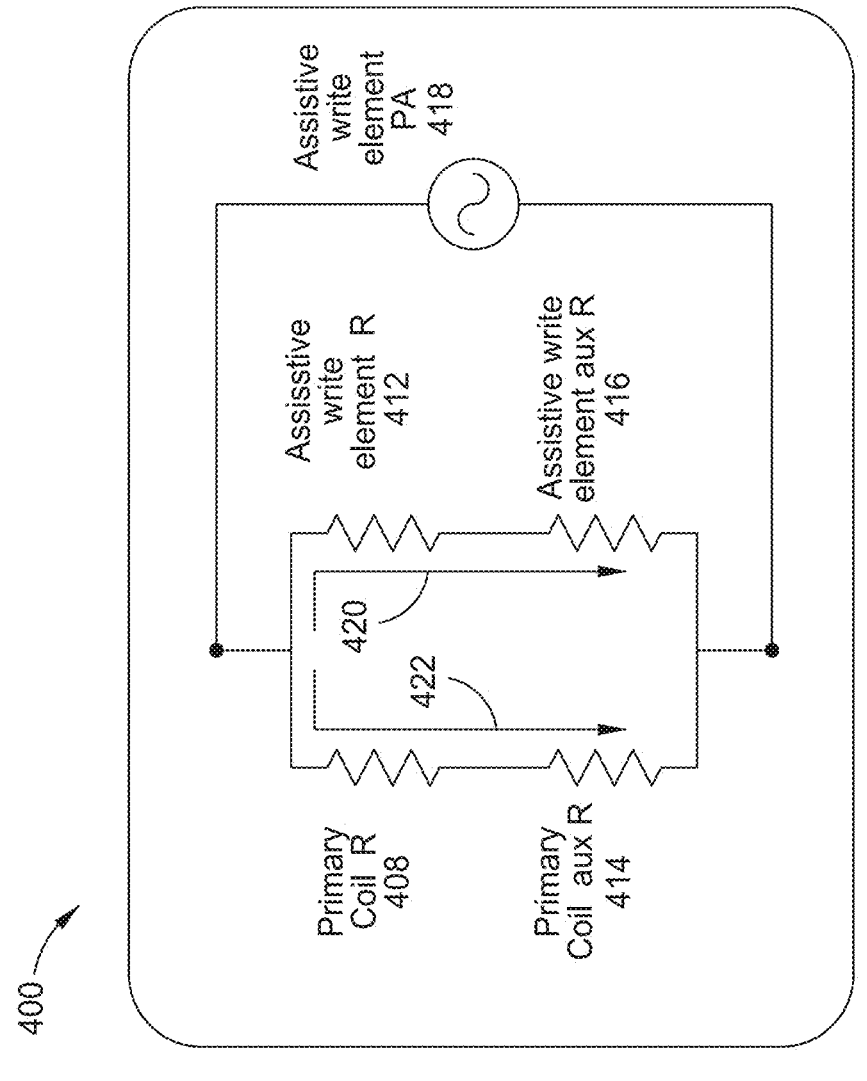
FIG. 4A illustrates a resistor network of a write head, according to one embodiment.
Figure 4B:
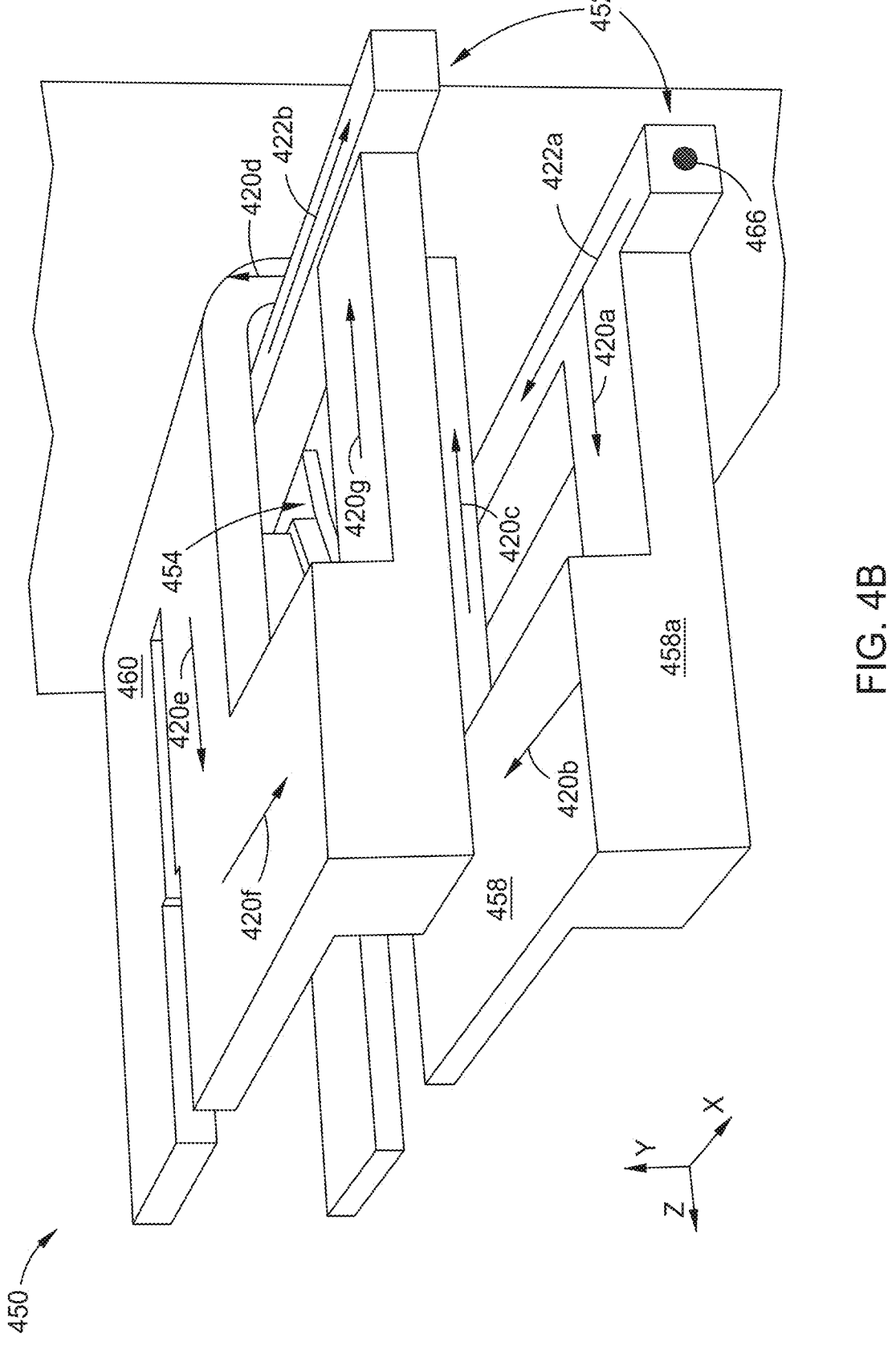
FIG. 4B illustrates an oblique view of the write head utilizing the resistor network of FIG. 4A, according to one embodiment.
Figure 4C:
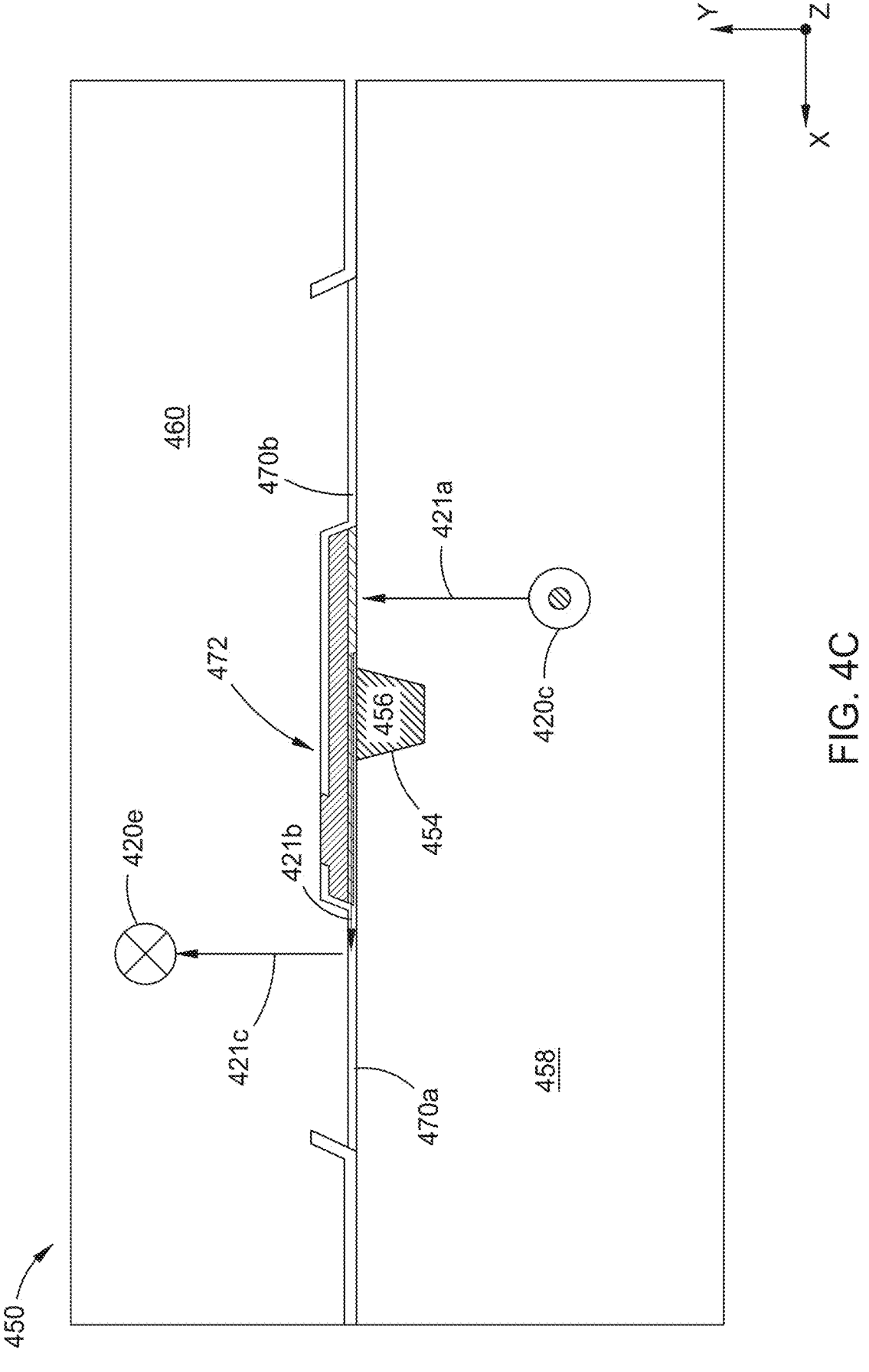
FIG. 4C illustrates a MFS view of the write head of FIG. 4B, according to one embodiment.

FIG. 4A illustrates a resistor network 400 of a magnetic recording head or write head 450, according to one embodiment. FIG. 4B illustrates an oblique view of the write head 450 utilizing the resistor network 400 of FIG. 4A, according to one embodiment. FIG. 4C illustrates an MFS view of the write head 450 of FIG. 4B, according to one embodiment. The write head 450 and the resistor network 400 may be utilized in the magnetic recording device 100 of FIG. 1. The write head 450 and the resistor network 400 may be utilized in the head assembly 200 of FIG. 2, such as where the write head 450 is the write head 210.

The resistor network 400 comprises two paths in parallel: (1) a first path 422 comprising a first resistor 408 (symbolizing the primary coil 452 around the main pole) and a first auxiliary (aux) resistor 414 in series, and (2) a second path 420 comprising a second resistor 412 (symbolizing the assistive write element 472) and a second aux resistor 416 in series. A preamplifier or preamp (PA) 418 is connected to both the first and second paths. In some embodiments, the aux resistors 414 and 416 can represent resistance of the respective circuit paths tuned by circuit path material selection and path length. In some embodiments, discrete resistances may be added along those paths for resistance ratio matching.

During operation, the preamp 418 is configured to apply current, which is then diverted into two parts, a first path 422 towards the first resistor 408 (symbolizing the primary coil 452 around the main pole) and a second path 420 towards the second resistor 412 (symbolizing the assistive write element 472). The first and second aux resistors 414, 416 are configured to tune the current ratio between the first and second paths 420, 422. For example, if more current is desired to flow to the primary coil 452 (symbolized by the resistor 408), the resistance of the second aux resistor 416 would be increased and the resistance of the first aux resistor 414 would be decreased, enabling more current to flow through the first current path 422. Thus, different amounts of current can be applied to the first path 422 and to the second path 420. Because the resistor network 400 utilizes only one preamp and aux resistors 414, 416 to tune the current through the resistor network 400, the cost of implementation is reduced relative to the above approach of using separate preamps and circuit paths, and current-amplitude-duration (IAD) of the current is easily and precisely tunable during operation.

As shown in FIG. 4B, the write head 450 comprises a main pole 454, a leading shield 458 disposed below the main pole 454, and a trailing shield 460 disposed over the main pole 454. The leading shield 458 comprises a leading structure 458a, where the leading structure 458a helps direct current to the leading shield 458 during operation. The primary coil 452 wraps around the main pole 454 near the MFS. While only one turn of the coil 452 is shown, the coil 452 may comprise any number of turns. The components of the write head 450 as symbolized by the resistor network 400 begin through a lead 466, such as having the preamp 418 driving a current into the lead 466.

When current is applied to the primary coil 452 using the first path 422, the current travels in the direction of the arrow 422a on a bottom portion of the coil 452, curls around in the y-direction, and flows in the direction of the arrow 422b such that the current circles through the coil 452.

When a portion of the current is diverted to the second path 420, the current flows in the direction of the arrow 420a (i.e., the z-direction) through the leading shield 458, away from the MFS. The current travels through the leading shield 458 in the direction of the arrow 420b (i.e., the –x-direction), and towards the MFS in the direction of the arrow 420c (i.e., the –z-direction). The current then flows towards the trailing shield 460 in the general direction of the arrow 420d (i.e., the y-direction), where the current flows through the assistive write element 472 in a cross-track direction, as discussed below in FIG. 4C. From there, the current flows through the trailing shield 460 in the direction of the arrow 420e (i.e., the z-direction), away from the MFS, before traveling through the back portion of the trailing shield 460 in the direction of the arrow 420f (i.e., the x-direction), and back towards the MFS in the direction of the arrow 420g (i.e., the –z-direction), to where the two current paths 420 and 422 converge. In one embodiment, with both the first path 422 and the second path 420, the current grounds where the trailing shield 460 meets the primary coil 452. Other ways of connecting the two paths 420, 422 can be done depending on head structures, where the two paths 420, 422 are parallel.

FIG. 4C illustrates an MFS view of the magnetic recording head 450, showing how the current flows in the first path 422 through the assistive write element 472 near the main pole 454, like briefly described with the arrow 420d of FIG. 4B. The leading shield 458 is connected to the trailing shield 460 through the assistive write element 472 disposed over the main pole tip 456. The assistive write element 472 is mostly isolated from the leading shield 458 with a first insulation layer 470a, and mostly isolated from the trailing shield 460 with a second insulation layer 470b. The first and second insulation layers 470a, 470b help direct the current through the assistive write element 472 (in the direction of the arrow 421b). As shown, the current flows through the leading shield 458 towards the MFS in the direction of arrow 420c. Once the current reaches the MFS, the current travels toward the assistive write element 472 in the y-direction (i.e., the down-track direction) as shown by the arrow 421a. The current then travels through the assistive write element 472 near the main pole 454 in the x-direction (cross-track direction), as shown by arrow 421b. The current then flows through the trailing shield 460 in the y-direction, shown by arrow 421c, before flowing away from the MFS through the trailing shield 460, as shown by arrow 420e.

The current flowing in the first path 422 through the leading shield 458 and the trailing shield 460 enables the current to flow through the assistive write element 472 close to the main pole 454, when the current travels near the MFS when flowing from the leading shield 458 to the trailing shield 460. The current traveling in this manner enables a magnetic field to be generated in the down-track direction (i.e., the y-direction) to facilitate magnetic recording. Furthermore, only one lead 466 is needed to connect a single preamp to the write head 450 whose components form the resistor network, rather than two separate leads and two separate preamps like the conventional circuits 300 and write head 350 of FIGS. 3A-3B.

It is noted that in other embodiments, the assistive write element may be configured differently than as shown in FIG. 4C, including cases where the current is not running in a cross-track direction. The general principle of the resistor network and divided but parallel current paths would still apply, to allow for a single preamp to drive current to both the main pole coils and the assistive write element.

Figure 5A:
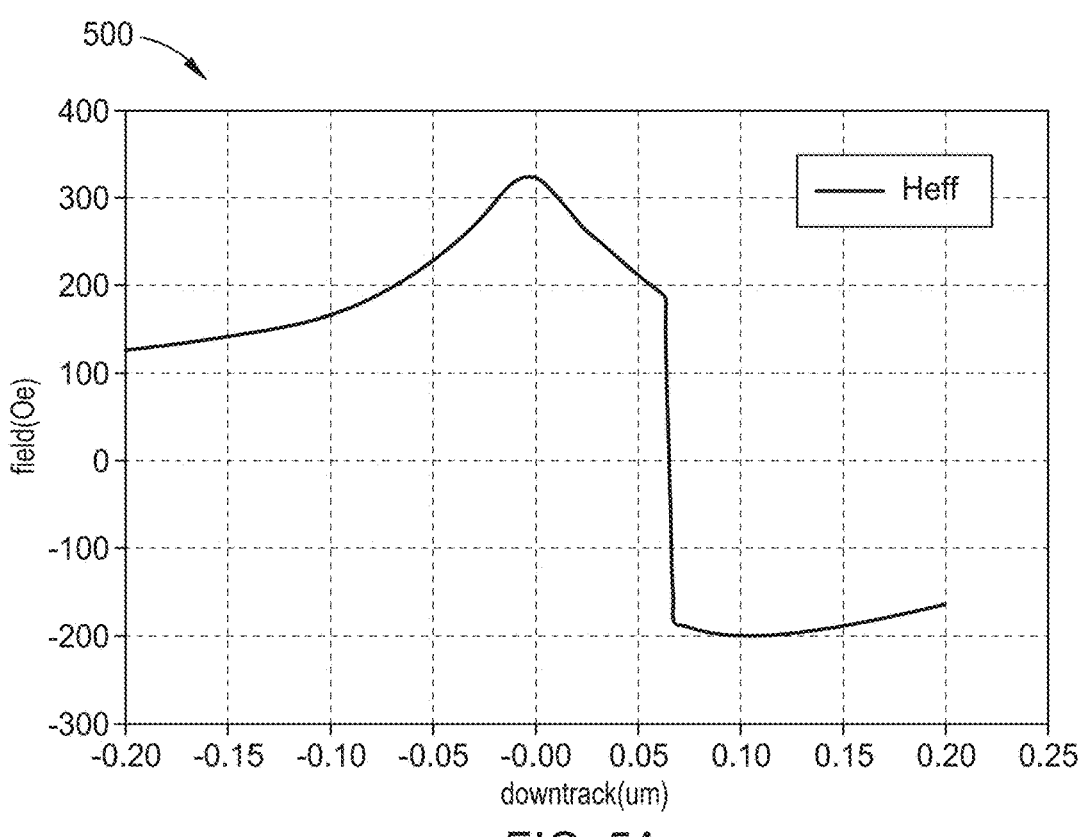
FIG. 5A illustrates a graph illustrating the magnetic field (Oe) of the conventional write head of FIG. 3B versus a downtrack direction (μm) of the magnetic field.
Figure 5B:
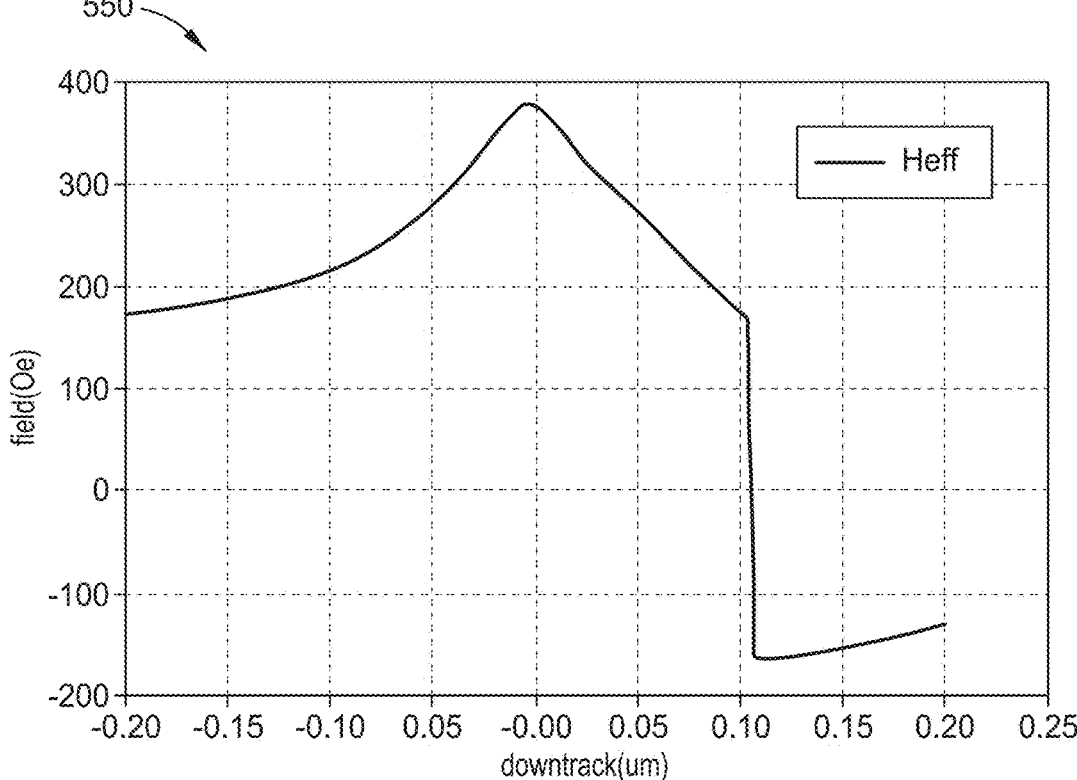
FIG. 5B illustrates a graph illustrating the magnetic field (Oe) of the write head of FIG. 4B versus a downtrack direction (μm) of the magnetic field, according to one embodiment.

FIG. 5A illustrates a graph 500 illustrating the magnetic field (Oe) of the conventional write head 350 of FIG. 3B versus a downtrack direction (μm) of the magnetic field. FIG. 5B illustrates a graph 550 illustrating the magnetic field (Oe) of the write head 450 of FIG. 4B versus a downtrack direction (μm) of the magnetic field, according to one embodiment.

In FIG. 5A, when a bias current of about 20 mA was applied to the second circuit 304 of the write head 350 (i.e., to the assistive write element), an effective magnetic field of about 320 Oe was achieved. In FIG. 5B, when a bias current of about 56.6 mA was applied to the resistor network 400 of the write head 450, an effective magnetic field of about 377 Oe was achieved at the main pole tip 456. Because the resistor network 400 diverts the current into the two current paths 420, 422, a greater amount of current is needed to achieve similar results, as only about 35% of the current is directed to the assistive write element 472 (the other 65% goes to the primary coil 452).

Therefore, by utilizing a resistor network connected by a single lead to a write head, current can be diverted into two paths, a first path to direct current to the primary coil and a second path to direct current to an assistive write element near the main pole tip. The resistor network enables the amount of current, the amplitude, and the duration the current is applied to each path to be individually and precisely tuned by using auxiliary resistances along those paths in the form of discrete resistances or current path material selections, lengths and/or configurations. Moreover, a greater amount of magnetic field can be generated at the main pole tip without any breakdown.

In one embodiment, a magnetic recording device comprises a preamplifier, a write head comprising: a trailing shield having a portion disposed at a media facing surface (MFS), a leading shield having a portion disposed at the MFS, a main pole disposed between the trailing shield and the leading shield, a primary coil wrapped around the main pole, an assistive write element, and a resistor network coupled to the preamplifier, the resistor network comprising: a first current path comprising the primary coil, and a second current path in parallel with the first current path, the second current path comprising the assistive write element.

The second current path is coupled to the first current path through the leading shield and the trailing shield. The second current path directs current from the leading shield, via the assistive write element, to the trailing shield at the MFS. The resistor network is coupled to the preamplifier by a single lead. The first current path further comprises a first auxiliary resistance connected in series with the primary coil, and wherein the second current path further comprises a second auxiliary resistance connected in series with the assistive write element. The first auxiliary resistance and the second auxiliary resistance are tunable to direct different amounts of current to the first current path and the second current path. The second auxiliary resistance is greater than the first auxiliary resistance.

In another embodiment, a magnetic recording device comprises a preamplifier, a write head comprising: a trailing shield having a portion disposed at a media facing surface (MFS), a leading shield having a portion disposed at the MFS, a main pole disposed between the trailing shield and the leading shield, an assistive write element, and a primary coil wrapped around the main pole, and a resistor network coupled to the preamplifier by a single lead, the resistor network comprising: a first current path comprising the primary coil and a first auxiliary resistance connected in series with the primary coil and a second current path in parallel with the first current path, the second current path comprising the assistive write element and a second auxiliary resistance connected in series with the assistive write element.

The second current path is coupled to the first current path through the leading shield and the trailing shield. The second current path directs current from the leading shield, via the assistive write element, to the trailing shield at the MFS. The second current path directs current to the leading shield in a first direction, the first direction being towards the MFS, and to the trailing shield in a second direction, the second direction being away from the MFS. The first current path is configured to direct current to the primary coil. The first auxiliary resistance and the second auxiliary resistance are tunable to direct different amounts of current to the first current path and the second current path. The current flows through the assistive write element in a cross-track direction, and wherein the current flowing through the assistive write element tip generates a magnetic field in a down-track direction.

In yet another embodiment, a magnetic recording device comprises a preamplifier, a write head comprising: a trailing shield having a portion disposed at a media facing surface (MFS), a leading shield having a portion disposed at the MFS, a main pole disposed between the trailing shield and the leading shield, an assistive write element, and a primary coil wrapped around the main pole, and a resistor network coupled to the preamplifier, the resistor network comprising: a first current path comprising the primary coil and a first auxiliary resistance connected in series with the primary coil, wherein the first current path is configured to direct current to the primary coil, and a second current path in parallel with the first current path, the second current path comprising the assistive write element and a second auxiliary resistance connected in series with the assistive write element, wherein the second current path is coupled to the first current path through the leading shield and the trailing shield.

The second current path directs current from the leading shield, via the assistive write element, to the trailing shield at the MFS. The resistor network is coupled to the preamplifier by a single lead. The current flows through the assistive write element in a cross-track direction at the MFS. The first auxiliary resistance and the second auxiliary resistance are tunable to direct different amounts of current to the first current path and the second current path. The second auxiliary resistance is greater than the first auxiliary resistance.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording device, comprising:
    a preamplifier;
    a write head comprising:
        a trailing shield having a portion disposed at a media facing surface (MFS);
        a leading shield having a portion disposed at the MFS;
        a main pole disposed between the trailing shield and the leading shield;
        a primary coil wrapped around the main pole;
        an assistive write element; and
    a resistor network coupled to the preamplifier, the resistor network comprising:
        a first current path comprising the primary coil and a first auxiliary resistance connected in series with the primary coil; and
        a second current path in parallel with the first current path, the second current path comprising the assistive write element and a second auxiliary resistance connected in series with the assistive write element.

2. The magnetic recording device of claim 1, wherein the second current path is coupled to the first current path through the leading shield and the trailing shield.

3. The magnetic recording device of claim 2, wherein the second current path directs current from the leading shield, via the assistive write element, to the trailing shield at the MFS.

4. The magnetic recording device of claim 1, wherein the resistor network is coupled to the preamplifier by a single lead.

5. The magnetic recording device of claim 1, wherein the first auxiliary resistance and the second auxiliary resistance are tunable to direct different amounts of current to the first current path and the second current path.

6. The magnetic recording device of claim 5, wherein second auxiliary resistance is greater than the first auxiliary resistance.

7. The magnetic recording device of claim 1, wherein current flows through the assistive write element in a cross-track direction at the MFS.

8. A magnetic recording device, comprising:
a preamplifier;
a write head comprising:
   a trailing shield having a portion disposed at a media facing surface (MFS);
   a leading shield having a portion disposed at the MFS;
   a main pole disposed between the trailing shield and the leading shield;
   an assistive write element; and
   a primary coil wrapped around the main pole; and
a resistor network coupled to the preamplifier by a single lead, the resistor network comprising:
   a first current path comprising the primary coil and a first auxiliary resistance connected in series with the primary coil; and
   a second current path in parallel with the first current path, the second current path comprising the assistive write element and a second auxiliary resistance connected in series with the assistive write element.

9. The magnetic recording device of claim 8, wherein the second current path is coupled to the first current path through the leading shield and the trailing shield.

10. The magnetic recording device of claim 9, wherein the second current path directs current from the leading shield, via the assistive write element, to the trailing shield at the MFS.

11. The magnetic recording device of claim 10, wherein the second current path directs current to the leading shield in a first direction, the first direction being towards the MFS, and to the trailing shield in a second direction, the second direction being away from the MFS.

12. The magnetic recording device of claim 8, wherein first current path is configured to direct current to the primary coil.

13. The magnetic recording device of claim 8, wherein the first auxiliary resistance and the second auxiliary resistance are tunable to direct different amounts of current to the first current path and the second current path.

14. The magnetic recording device of claim 8, wherein current flows through the assistive write element in a cross-track direction, and wherein current flowing through the assistive write element tip generates a magnetic field in a down-track direction.

15. A magnetic recording device, comprising:
a preamplifier;
a write head comprising:
   a trailing shield having a portion disposed at a media facing surface (MFS);
   a leading shield having a portion disposed at the MFS;
   a main pole disposed between the trailing shield and the leading shield;
   an assistive write element; and
   a primary coil wrapped around the main pole; and
a resistor network coupled to the preamplifier, the resistor network comprising:
   a first current path comprising the primary coil and a first auxiliary resistance connected in series with the primary coil, wherein the first current path is configured to direct current to the primary coil; and
   a second current path in parallel with the first current path, the second current path comprising the assistive write element and a second auxiliary resistance connected in series with the assistive write element, wherein the second current path is coupled to the first current path through the leading shield and the trailing shield.

16. The magnetic recording device of claim 15, wherein the second current path directs current from the leading shield, via the assistive write element, to the trailing shield at the MFS.

17. The magnetic recording device of claim 15, wherein the resistor network is coupled to the preamplifier by a single lead.

18. The magnetic recording device of claim 15, wherein the current flows through the assistive write element in a cross-track direction at the MFS.

19. The magnetic recording device of claim 15, wherein the first auxiliary resistance and the second auxiliary resistance are tunable to direct different amounts of current to the first current path and the second current path.

20. The magnetic recording device of claim 19, wherein the second auxiliary resistance is greater than the first auxiliary resistance.

* * * * *